Aug. 17, 1954    L. A. LEIFER ET AL    2,686,448
HYDRAULIC SCREW FEED
Filed July 31, 1950    3 Sheets-Sheet 1
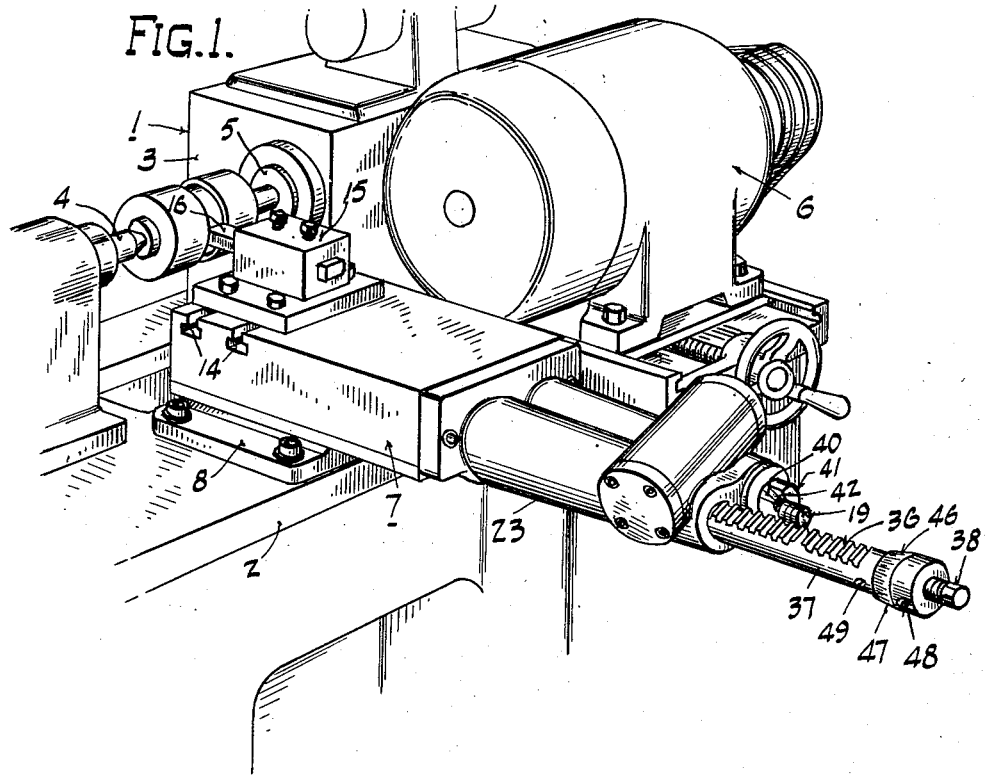
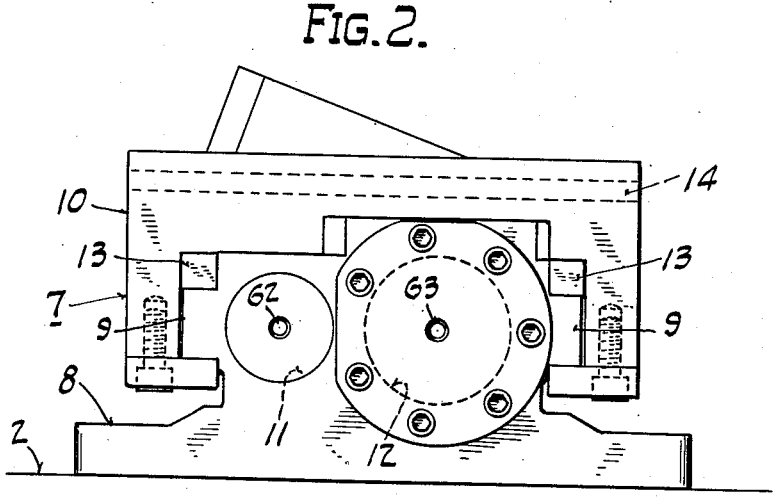
INVENTORS
Lorenz A. Leifer
Lewis W. Premo
BY
ATTORNEYS.

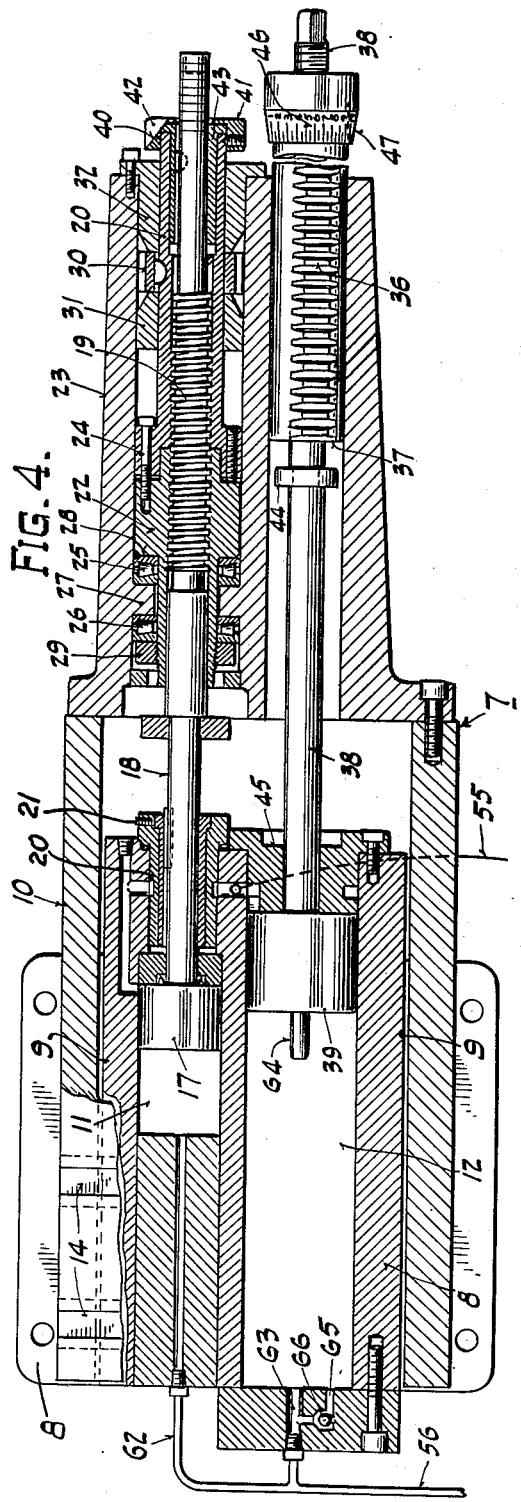
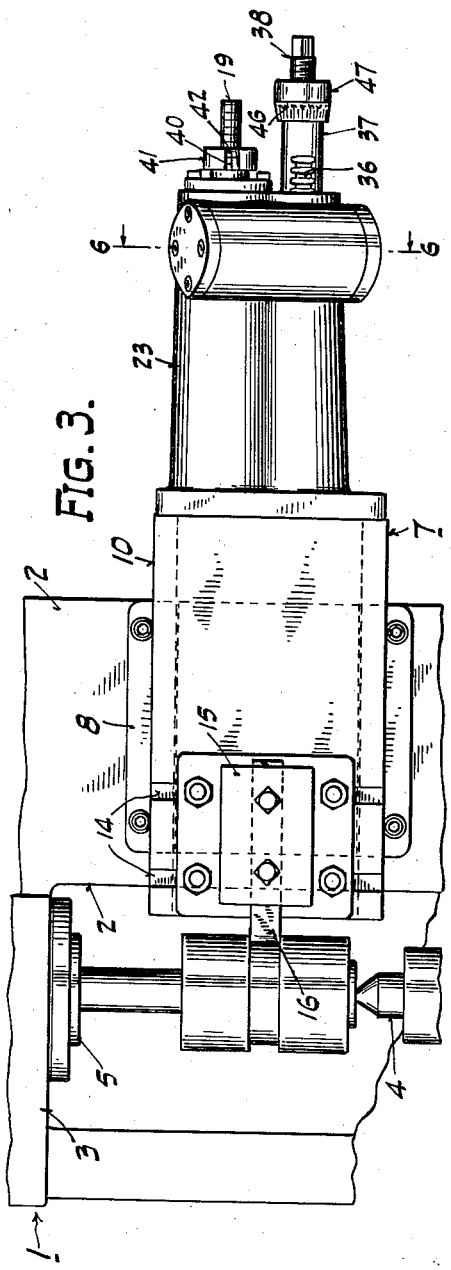

Aug. 17, 1954                L. A. LEIFER ET AL                2,686,448
                              HYDRAULIC SCREW FEED
Filed July 31, 1950                                         3 Sheets-Sheet 3
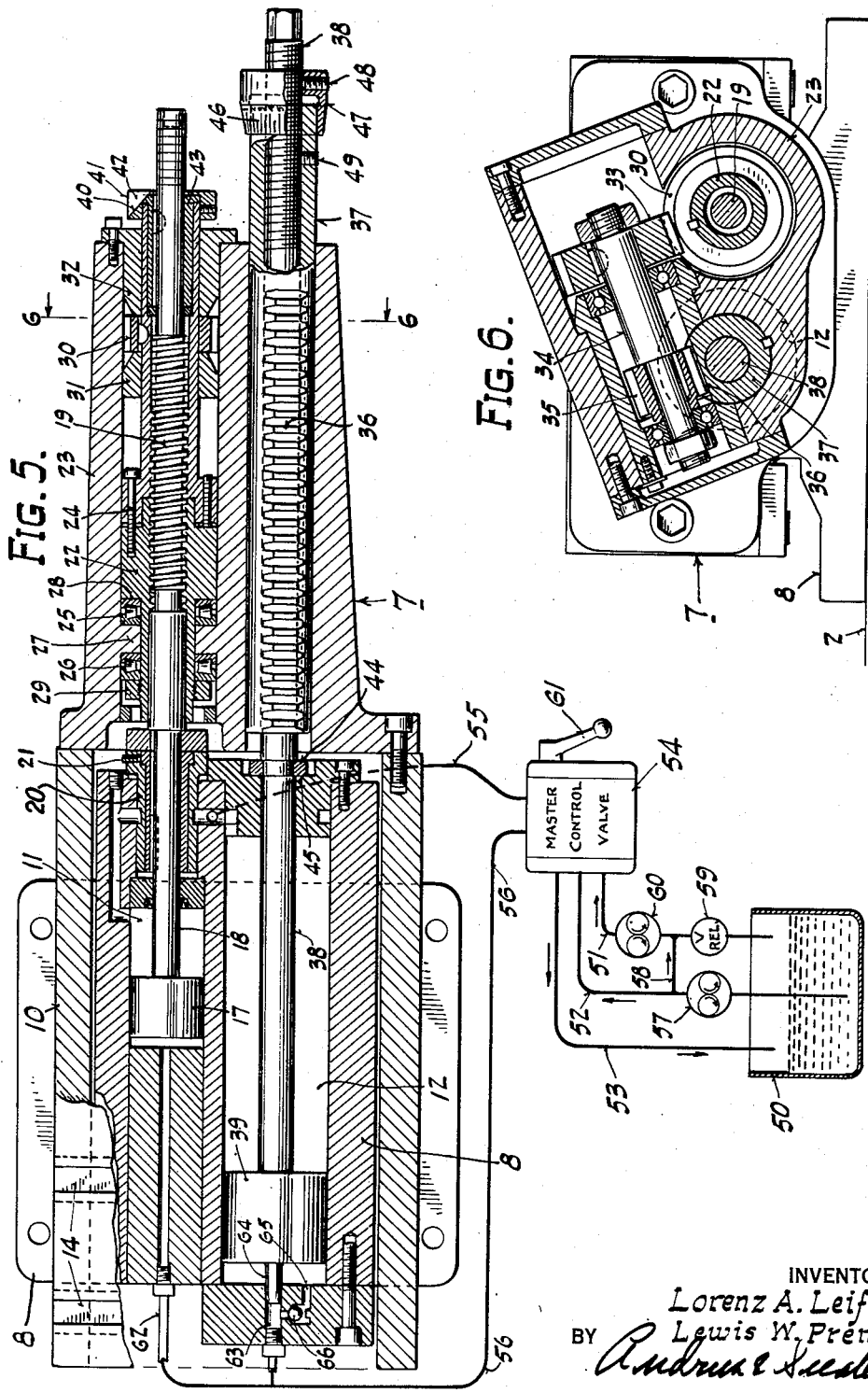
INVENTORS
Lorenz A. Leifer
Lewis W. Premo
BY
ATTORNEYS.

Patented Aug. 17, 1954

2,686,448

UNITED STATES PATENT OFFICE 2,686,448

HYDRAULIC SCREW FEED

Lorenz Albert Leifer and Lewis W. Premo, Madison, Wis., assignors to Gisholt Machine Company, Madison, Wis., a corporation of Wisconsin Application July 31, 1950, Serial No. 176,894

10 Claims. (Cl. 82—24)

This invention relates to a hydraulic screw feed and has found application in the accurate feeding of cutting tools on lathes and the like.

One of the principal objects of the invention is to provide a hydraulically powered lead screw and to thereby utilize the infinite variations in speed possible with hydraulic controls.

Another object of the invention is to provide a more accurate slide feed with a lead screw.

Another object is to provide a very fine adjustment for depth of cut with a lead screw.

Another object is to provide a very accurate, sensitive and effective stop for the lead screw.

Another object is to provide a hydraulic lead screw mechanism wherein a relatively large volume of operating fluid is employed, thereby minimizing the effect of fluid leakage.

Another object is to provide a hydraulic lead screw mechanism wherein a relatively low fluid pressure is employed and is multiplied in power to thereby minimize the effects of temperature changes and the like.

Another object is to provide a rapid traverse operation for the lead screw without interfering with the accurate lead screw feed control.

Another object is to provide an attachment which may be applied to any machine tool for effecting feeding operations.

Other objects and advantages of the invention will appear hereinafter in connection with the description of an application of the invention to the tool slide feed of a lathe, as illustrated in the accompanying drawings.

In the drawings:

Figure 1 is a perspective view of a portion of a lathe showing a tool-slide and the hydraulic lead screw feed therefor in the form of an attachment;

Fig. 2 is a front elevation of the slide and the lead screw attachment;

Fig. 3 is a top plan view of the slide and lead screw attachment;

Fig. 4 is an enlarged longitudinal section taken centrally of the lead screw and of the power cylinder showing the parts prior to the commencement of a feeding operation;

Fig. 5 is a similar view showing the parts at the instant of completion of the cut and with a schematic view of the hydraulic power circuit; and Fig. 6 is an enlarged transverse section taken longitudinally of the cross shaft on line 6—6 of Fig. 3.

In carrying out the invention the lead screw is held against rotation and a nut thereon is driven by a hydraulic cylinder and piston through an intermediate rack and worm gear providing a substantial power ratio, the nut being mounted to provide feed and traverse thrust to the tool slide. Quick traverse is provided by a direct hydraulic thrust movement of the lead screw. A micrometer-type adjustment is obtained between the drive piston and the rack mounted thereon for fine adjustment of the depth of cut. A similar coarse adjustment is provided between the nut and lead screw to determine the position of the traverse movement.

When the invention is employed on a lathe the hydraulic drive is correlated to the spindle rotation and automatic pressure trip valves are employed to provide the desired sequence of movements which normally include forward traverse, forward feed, and back traverse to starting position. Both traverse movements preferably include a quick traverse which in the case of back traverse quickly withdraws the tool from the work.

The invention has been embodied in an attachment applicable to various machine tools, and is illustrated as applied to a lathe 1 having a bed 2, a headstock 3 and a tailstock 4.

The headstock 3 of the lathe has the rotary spindle 5 driven by means of suitable clutches and transmission gearing within the headstock from the electric drive motor 6 mounted on the rear of the same.

The tool feed attachment 7 is mounted on the bed 2 on the rear side and comprises a base 8 bolted to the top of the bed and providing ways 9 for the tool-cross-slide 10.

The base 8 carries a pair of power cylinders 11 and 12 disposed between the ways 9 and parallel thereto.

The slide 10 has a flat top and downwardly depending side flanges constituting a cover for the base and which provide tapered gibs 13 matching the ways 9 for guiding the slide 10 in its movement toward and away from the work.

The slide 10 has a pair of T-slots 14 in its upper surface for adjustably mounting a tool block 15 carrying the cutting tool 16.

The power cylinder 11 is a short stroke traverse cylinder having a piston 17 and piston rod 18, which for all practical purposes of operation of cylinder 11, may be considered directly connected to slide 10. In previous hydraulic cross-slide or tool-slide feeds it was customary to utilize such a direct connected power cylinder for all traverse and feed purposes, with the result that it was necessary to employ high-fluid pressure and very accurate feed of the fluid to the cylinder, and even then chatter and undesirable inaccuracies of cut could not be fully eliminated.

In carrying out the present invention in the embodiment illustrated, the feed of the tool slide is obtained by means of a lead screw 19 constituting the outer end of piston rod 18 and which provides a very accurate control of the cut by eliminating variations in back pressure upon the fluid drive. The lead screw 19 is normally held against rotation by bushing 20 keyed thereto and secured against rotation by set screw 21. The lead screw 19 carries a rotary nut 22 threaded thereon and which in turn is mounted for rotation in a cylindrical housing 23 constituting an outward extension of the slide 10.

The nut 22 consists of a sleeve made up of two aligned cylindrical parts having a parting line centrally of the threaded section and which are constructed to be secured together by bolts 24 which provide for axial adjustment of the sleeve parts so that the flank of the threads of one part engage the threads of lead screw 19 on one side of the threads while the flank of the threads of the other part engage the threads of the lead screw 19 on the opposite side, thereby adjustably eliminating backlash between the nut 22 and lead screw 19.

The nut 22 is constructed to transmit axial thrust forces to slide 10 by means of the roller thrust bearings 25 and 26 disposed on opposite sides of an internal flange 27 of housing 23.

Bearing 25 abuts flange 27 on its inner side and a shoulder 28 of nut 22 on its outer side. Bearing 26 abuts flange 27 on its outer side and a nut 29 secured on the inner sleeve-like end of nut 22. The nut 29 serves to eliminate play in the thrust bearings 25 and 26 whereby an accurate control of the movement of slide 10 by nut 22 is provided at all times.

The nut 22 is rotationally driven by a gear 30 keyed on the outer end thereof and held to move axially therewith by means of a pair of guide bushings 31 and 32 for nut 22 in the outer end of housing 23.

The gear 30 is driven by a complemental worm gear 33 meshing therewith and mounted on a cross shaft 34 mounted for rotation in suitable bearings in an adjacent part of housing 23.

A spur gear 35 on the other end of shaft 34 meshes with a drive rack 36 on a sleeve 37 carried by a piston rod 38 whose piston 39 operates in power cylinder 12.

The feed of slide 10 is effected by the rotational threading of nut 22 upon lead screw 19 by reason of the movement of piston 39 in cylinder 12 and the consequent movement of rack 36 rotating gear 35, shaft 34 and worm gear 33 and in turn gear 30 on nut 22.

The feed drive described provides a substantial speed reduction and mechanical advantage in feeding the slide 10. In the construction illustrated, the ratio is 20 to 1, i. e. the axial movement of piston 39 is twenty times that of nut 22 and slide 10, thereby providing a very substantial power advantage.

In addition to the power advantage described, it is possible to construction piston 39 with a substantial area so that low pressures may be employed for the hydraulic system, thereby reducing the leakage and taking advantage of the fact that it is generally easier to provide a large volume of oil flow at a lower pressure than to provide a small volume at a high pressure. A low pressure large volume system has less variableness due to leakage and due to temperature changes that might effect changes in oil volume and in conduit sizes.

In the attachment illustrated an oil pressure of one hundred pounds per square inch (100 lbs. p. s. i.) will produce a thrust force inwardly on a ten-square-inch piston 39 of one thousand pounds (1,000 lbs.) which is multiplied to a thrust force of twenty thousand pounds (20,000 lbs.) on the cutting tool 16.

A coarse and fine adjustment is provided which effects a very accurate control of the depth of cut. For this purpose the coarse adjustment is obtained by releasing set screw 21 and threading lead screw 19 either inwardly or outwardly of nut 22 by applying a suitable wrench to the outer end of the lead screw. A complete revolution of lead screw 19 relative to nut 22 will provide an axial adjustment equal to the pitch of the thread therebetween, which, in the embodiment illustrated is approximately one-quarter of an inch (1/4"). A scale 40 in a head 41 on the outer end of nut 22 serves to indicate similar adjustments corresponding to one one-hundredth of an inch (.01").

The scale 40 constitutes graduations in the face of a conical surface exposed in a window 42 in head 41 and which are matched by corresponding graduations on a conical surface of a flanged sleeve 43 keyed to the lead screw 19, the flange on sleeve 43 rotating within head 41 and having its scale graduations exposed through the window 42.

The turning of lead screw 19 by a wrench applied to its outer end effects relative movements of the graduations of scale 40 which can be read in terms of hundredths of an inch, meaning that the movement of slide 10 will have its quick traverse, traverse and feed limits set a predetermined number of hundredths of an inch closer to the axis of the spindle 5 or farther therefrom according to the adjustment made.

The fine adjustment which determines the depth of cut for tool 16 is essentially a stop adjustment for the feed and is actually superimposed upon the coarse adjustment described above.

The fine adjustment is provided by employing sleeve member 37 through which piston rod 38 is threaded, so that the position of rack 36 upon the piston rod 38 may be adjusted by turning the latter by a wrench applied to the outer end of the piston rod. For that purpose, sleeve 37 is keyed to housing 23 to prevent turning of the sleeve.

The stop is provided by a collar 44 firmly attached on the piston rod 38 engaging the face 45 of the base 8 at the head of cylinder 12 and thereby determining the feeding movement. The longitudinal position of rack 36 on piston rod 38 determines the position of cutting tool 16 at the time stop collar 44 engages face 45 of base 8.

The adjustment for the position of rack 36 on piston rod 38 in relation to stop collar 44 is calibrated on a scale 46 comprising graduations marked around the circumference of a dial member 47 secured by a set screw 48 to the outer end of piston rod 38 and encircling the outer end of the sleeve member 37 carrying rack 36. The set screw 49 normally securing piston rod 38 from turning relative to sleeve 37 should be released prior to effecting the adjustment described.

Each long graduation on scale 46 represents a distance of two one-thousandths of an inch (.002") and the intermediate short graduation on scale 46 represents a distance of one one-thousandth of an inch (.001") in relative movement between rack 36 and stop collar 44.

Since the movement of tool 16 is only one-twentieth that of rack 36 in operation of the drive, the adjustments described above for scale 46 provide a one-ten-thousandth of an inch (.0001") adjustment in depth of cut of tool 16 for each long graduation on the scale, and a one-half ten-thousandth of an inch (.00005") adjustment in depth of cut of tool 16 for each intermediate short graduation on the scale.

Since the piston 39 has to move twenty times as far as the cutting tool 16 in the illustrated embodiment described, the maximum possible length of feed for tool 16 is one-twentieth of the maximum operative length of movement of piston 39 in cylinder 12 having regard to the stop collar 44.

The hydraulic system for operating pistons 17 and 39 comprises a sump 50, with three conduits or passages 51, 52 and 53, respectively, leading to the master control valve 54 from which conduit 55 leads to the right hand or outer ends of both cylinders 11 and 12, and a conduit 56 leads to the left hand or inner ends of both cylinders 11 and 12.

The passage 52, illustrated as the central passage in Fig. 5 contains the main supply pump 57, often referred to as the traverse pump. A branch passage 58 leads from the passage 52 at the discharge side of pump 57 to passage 51.

In line 51, between the connection of passage 58 with passage 51 and the sump 50 there is a pressure relief valve 59 which regulates the fluid pressure supplied by the main pump 57. In line 51, between the connection of passage 58 with passage 51 and the master control valve 54 there is a feed pump 60 which is designed to raise the pressure for a relatively small quantity of fluid to effect a power feed for the tools.

The line 53 constitutes a return line from valve 54 to the sump 50.

The valve 54 is of any suitable automatic hydraulic valve construction wherein a plunger is made to shift automatically to successive positions by pressure surges in the power line. A manual control lever 61 on the valve serves to initiate each cycle of operation.

In operation, after the starting movement of lever 61, and with the parts in the position shown in Fig. 4, the master control valve 54 admits pressure fluid from both the traverse pump 57 and the feed pump 60 through conduit 55 to the outer end of both cylinders 11 and 12, thereby forcing both pistons 17 and 39 inwardly at the same time and moving the entire slide 10 inwardly at a quick traverse rate.

The oil in the inner end of cylinder 11 is forced by piston 17 to escape through a branch passage 62 of conduit 56, and from thence through valve 54 to the return line 53 and sump 50.

The oil in the inner end of cylinder 12 is forced by piston 39 to escape through pilot port 63 into conduit 56, and from thence through valve 54 to the return line 53 and sump 50.

When piston 17 reaches its extreme inward position as in Fig. 5 the traverse fluid continues to move piston 39 inwardly at a traverse rate, thereby operating rack 36 and effecting rotation of nut 22 which in turn compels continued movement of slide 10 inwardly at a traverse rate until the tools reach the initial cut location, whereupon pilot plug 64 enters port 63 closing the same.

When port 63 is closed, as described above, the discharge fluid from the inner end of cylinder 12 flows through a by-pass passage 65 having a ball check valve 66 therein which is normally open to the flow of fluid at feed rates but which is forced to close when the traverse flow is imposed therethrough.

Closing of valve 66, as described above, bars further inward movement of piston 39 and results in a pressure surge or impulse being transmitted back through the driving fluid to the master control valve 54, effecting a shifting of the latter to a position wherein passage 52 is closed and fluid is supplied to the outer end of cylinder 12 only from feed pump 60 in passage 51.

The momentary shutting off of pressure fluid from cylinder 12 during shifting of valve 54 permits ball check valve 66 to drop to open position. Thereafter a forward feed of piston 39 is effected by power fluid from feed pump 60 at a rate which does not compel closing of valve 66.

The feed of slide 10 and tool 16 continues until stop collar 44 engages stop surface 45, whereupon the movement of piston 39 is terminated and a pressure surge or impulse is transmitted back through the driving fluid to valve 54, shifting the latter to a back traverse position.

In the back traverse position valve 54 transmits power fluid from both pumps 57 and 60 in lines 52 and 51, respectively, through conduit 56 to the inner ends of both cylinders 11 and 12 thereby forcing pistons 17 and 39 outwardly together. The piston 17 thereupon moves outwardly its full stroke in cylinder 11 giving a quick back traverse to slide 10 effecting an initial rapid withdrawal of tool 16 from the work. After piston 17 reaches the outer end of cylinder 11, traverse movement of slide 10 continues by a traverse outward movement of piston 39 in cylinder 12, rotating nut 22 to effect the same. When piston 39 reaches the outer end of cylinder 12 its movement terminates and a pressure surge or impulse is transmitted back through the conduit 56 to master control valve 54 shifting the latter to a shut-off position. The oil in cylinders 11 and 12 will retain pistons 17 and 39 in their outermost positions until the lever 61 is again moved to open the valve 54 and start a cycle.

The operator utilizes the time involved in traversing rack 36 outwardly to start position in which to unload and load the machine.

The invention provides a very smooth feed capable of adjustment to as low as one-half a ten-thousandths of an inch (.00005") per revolution of the spindle 5.

The slide movement is so accurate that repeated operation over many cycles will retain extremely close tolerances in depth of cut.

The fast coarse adjustment is of particular advantage when changing from and to various sizes of work.

The fine adjustment gives excellent accuracy of operation.

The large fluid volume employed during feeding is of considerable advantage in effecting a quick rise in pressure upon engagement of stop collar 44 with face 45 and a reversing of valve 54 in only a small fraction of a revolution of spindle 5.

The invention avoids errors previously encountered in hydraulic drives for slides since the lead screw protects the pressure fluid against changes caused by variations or differences in tool hardness and cutting conditions. Consequently, the pressure engagement between stop collar 44 and face 45 will be much alike for each cycle of operation and there will be very little tolerance variation due to possible changes of stop pressures.

Furthermore, any variation in stop pressures will hardly effect the tool position at all, since the ratio of movement of stop collar 44 to the movement of the tool is high, i. e. of the order of twenty to 1 (20:1) in the embodiment illustrated. This high ratio of movement between the stop and the tool greatly increases the accuracy of the cut.

The quick traverse provided by cylinder 11 and piston 17 may be eliminated where the ordinary traverse and feed of cylinder 12 and piston 39 is satisfactory. Where the quick traverse is employed and it is desired to obtain the full advantage of the previously described 20,000 pounds pressure feed on the tool, a high pressure fluid supply should be provided to cylinder 11 separate from and instead of the supply from line 55, or in lieu thereof some means of securing the piston 17 against back thrust movement.

The invention may be employed in various types of machines, and for almost any use wherein it is desired to control a hydraulic feeding movement to an accurate stop position.

Various embodiments of the invention may be employed within the scope of the following claims.

I claim:

1. In a device of the class described for feeding a tool slide, feed screw and nut elements assembled in threaded relation to each other and disposed to effect feeding of the tool slide by relative axial movement between the elements resulting from relative rotation, means normally securing one of said elements against rotation while leaving the other free to rotate, means normally securing one of said threaded elements against axial movement while leaving the other free to move axially under threading engagement therewith, thrust means to transmit movement to the slide from said axially movable threaded element, a hydraulic power cylinder member having a piston member therein disposed to be relatively moved axially by means of power liquid flow into a corresponding end of the cylinder member, means to secure one of said members against axial movement while leaving the other member free to move axially, a gear rack on said axially movable member, a gear on said rotational element, an intermediate gear drive carried by the slide and connecting said rack and said gear whereby the feed of the tool slide is effected by a substantially large volume of flow of low-pressure power liquid into the cylinder member to move one of said cylinder and piston members axially and actuate the gear driving the rotational element through operation of the rack and gear drive by said axial movement of said member, and means to effect a quick traverse movement of the slide by moving said feed screw and nut bodily axially, said rack being disposed parallel to said traverse and feed movements whereby said intermediate gear drive moves along said rack during the traverse and feed movements described.

2. In a device of the class described for feeding a tool slide, lead screw and nut elements assembled in threaded relation to each other and disposed to effect feeding of the tool slide by relative axial movement between the elements resulting from relative rotation, means normally securing one of said elements against rotation while leaving the other free to rotate, means normally securing one of said threaded elements against axial movement while leaving the other free to move axially under threading engagement therewith, thrust means to transmit movement to the slide from said axially movable threaded element, a hydraulic power cylinder member having a piston member therein disposed to be relatively moved axially by means of power liquid flow into a corresponding end of the cylinder member, means to secure one of said members against axial movement while leaving the other member free to move axially, a gear rack on said axially movable member, a gear on said rotational element, an intermediate gear drive carried by the slide and connecting said rack and said gear and providing a substantial mechanical advantage between said hydraulic power drive and said lead screw feed whereby the feed is effected by a substantially large volume of flow of low-pressure power liquid into the cylinder member to move one of said cylinder and piston members axially and actuate the gear driving the rotational element through operation of the rack and gear drive by said axial movement of said member, a stop between said cylinder and piston members to limit the feeding movement of the slide with the mechanical advantage enhancing the accuracy of the final feed position, and means to adjust the axial position of said rack upon said axially movable member in fine increments whereby said mechanical advantage effects a correspondingly fine adjustment of the slide feed termination by said stop.

3. In a device of the class described for feeding a tool slide, lead screw and nut elements assembled in threaded relation to each other and disposed to effect feeding of the tool slide by relative axial movement between the elements resulting from relative rotation, means normally securing one of said elements against rotation while leaving the other free to rotate, means normally securing one of said threaded elements against axial movement while leaving the other free to move axially under threading engagement therewith, thrust means to transmit movement to the slide from said axially movable threaded element, a hydraulic power cylinder member having a piston member therein disposed to be relatively moved axially by means of power liquid flow into a corresponding end of the cylinder member, means to secure one of said members against axial movement while leaving the other member free to move axially, a sleeve threaded onto said axially movable member and having a gear rack thereon, means normally preventing threading adjustment between said sleeve and axially movable member, a gear on said axially movable rotational element to drive the same, an intermediate gear drive carried by the slide and connecting said rack and gear whereby the feed of the tool slide is effected by a substantially large volume flow of low-pressure power liquid into the cylinder member to move one of said cylinder and piston members axially and actuate the gear driving the rotational element through operation of the rack and gear drive by said axial movement of said member, a stop between said cylinder and piston members to limit the feeding movement of the slide, means to effect threading adjustment between said sleeve and axially movable member to accurately predetermine the final feed position, and means to provide an adjusted zone of feeding movement of the slide by effecting an adjusting rotation of said normally non-rotatable element relative to said rotational element.

4. In a lathe, a tool slide, a support for said slide, a pair of hydraulic cylinders disposed side by side in said support, pistons operable in said cylinders, one of said pistons having a threaded rod and the other having a rod with a longitudinal gear rack thereon, said rods extending side by side axially from the corresponding cylinders, a housing for said rods carried by said slide, a nut on said threaded rod disposed with thrust bearings operably engaging an abutment within said housing and moving the same and said slide with axial movement of the nut, and a gear drive carried by said housing and connecting said rack and nut to effect rotation of the latter upon movement of the piston carrying said rack relative to the other piston, both of said cylinders cooperating to effect traverse movement of said slide, and said last named piston effecting slide feed.

5. In a lathe, a tool slide, a support for said slide, a hydraulic cylinder in said support, a piston operable in said cylinder and having a piston rod extending outwardly of the cylinder, an extension carried by said slide and housing said rod, a gear rack on said piston rod, a lead screw carried by said support and extending parallel to said piston rod in said slide extension, a feed nut threaded upon said lead screw and having thrust engagement with an abutment within said slide extension, means to secure one of said two last named elements against rotation, a gear drive carried by said slide extension between said rack and the other of said named elements to rotate the latter and effect movement of said slide in response to movement of said piston, and means within said support to move said lead screw and nut axially bodily with said slide and slide extension, and rack and piston for a predetermined traverse distance for the slide.

6. A lathe attachment comprising, a tool slide, a support for said slide adapted to be secured by a lathe bed, a pair of hydraulic cylinders disposed side by side in said support, pistons operable in said cylinders, one of said pistons having a threaded rod and the other having a rod with a longitudinal gear rack thereon, said rods extending side by side axially from the corresponding cylinders, a housing for said rods carried by said slide, a nut on said threaded rod disposed with thrust bearings operably engaging an abutment within said housing and moving the same and said slide with axial movement of the nut, a gear meshing with said rack and secured to a cross shaft carried by said housing and extending adjacent and laterally of said rods, and a worm gear on said shaft meshing with a worm gear on said nut to drive the latter, both of said cylinders cooperating to effect traverse movement of said slide, and said last named piston effecting slide feed.

7. In a lathe, a tool slide, a support for said slide, a pair of hydraulic cylinders disposed side by side in said support, pistons operable in said cylinders, one of said pistons having a threaded rod and the other having a rod with a longitudinal gear rack thereon, a slide extension housing said piston rods, a nut on said threaded rod disposed with thrust bearings operably engaging an abutment within said slide extension and moving the same with axial movement of the nut, a gear drive carried by said slide extension and connecting said rack and nut to effect rotation of the latter upon movement of the piston carrying said rack relative to the other piston, and a stop on the piston rod carrying said rack disposed to engage a corresponding stop on said slide support to effect a termination for the tool cut, both of said cylinders cooperating to effect traverse movement of said slide, and said last named piston effecting slide feed.

8. In a lathe, a tool slide, a support for said slide, a pair of hydraulic cylinders disposed side by side in said support, pistons operable in said cylinders, one of said pistons having a threaded rod and the other having a rod with a longitudinal gear rack thereon, a nut on said threaded rod disposed with thrust bearings operably engaging said slide and moving the same with axial movement of the nut, a gear drive between said rack and nut to effect rotation of the latter upon movement of the piston carrying said rack relative to the other piston, a stop on the piston rod carrying said rack disposed to engage a corresponding stop on said slide support to effect a termination for the tool cut, and means to adjust the axial position of said rack upon the piston rod carrying the same to effect a fine adjustment for termination of the tool cut by said stop, both of said cylinders cooperating to effect traverse movement of said slide, and said last named piston effecting slide feed.

9. In a lathe, a tool slide, a support for said slide, a pair of hydraulic cylinders disposed side by side in said support, pistons operable in said cylinders, one of said pistons having a threaded rod and the other having a rod with a longitudinal gear rack thereon, a nut on said threaded rod disposed with thrust bearings operably engaging said slide and moving the same with axial movement of the nut, a gear drive between said rack and nut to effect rotation of the latter upon movement of the piston carrying said rack relative to the other piston, a stop on the piston rod carrying said rack disposed to engage a corresponding stop on said slide support to effect a termination for the tool cut, means to adjust the axial position of said rack upon the piston rod carrying the same to effect a fine adjustment for termination of the tool cut by said stop, and means to adjust the axial position of said nut relative to the piston rod carrying the same to effect a coarse adjustment for the traverse movement and for termination of the tool cut by said stop, both of said cylinders cooperating to effect traverse movement of said slide, and said last named piston effecting slide feed.

10. In a lathe, a tool slide, a support for said slide, a pair of hydraulic cylinders disposed side by side in said support, pistons operable in said cylinders, one of said pistons having a threaded rod and the other having a rod with a longitudinal gear rack thereon, a nut on said threaded rod disposed with thrust bearings operably engaging said slide and moving the same with axial movement of the nut, a gear drive between said rack and nut to effect rotation of the latter upon movement of the piston carrying said rack relative to the other piston, a stop on the piston rod carrying said rack disposed to engage a corresponding stop on said slide support to effect a termination for the tool cut, means to adjust the axial position of said rack upon the piston rod carrying the same to effect a fine adjustment for termination of the tool cut by said stop, means to adjust the axial position of said nut relative to the piston rod carrying the same to effect a coarse adjustment for the traverse movement and for termination of the tool cut by said stop, and means to supply power liquid to said cylinders in correlation to effect a cutting cycle which includes an initial quick forward traverse, a short intermediate forward traverse, a forward feed to stop position, an initial quick back traverse and a final back traverse which resets the feed screw for the next cycle.

References Cited in the file of this patent

UNITED STATES PATENTS

| Number | Name | Date |
|---|---|---|
| 348,568 | McGowan | Sept. 7, 1886 |
| 428,703 | Taylor | May 27, 1890 |
| 804,510 | Vaughan | Nov. 14, 1905 |
| 1,367,459 | Carson | Feb. 1, 1921 |
| 1,660,977 | Smith | Feb. 28, 1928 |
| 1,661,016 | Smith | Feb. 28, 1928 |
| 1,976,125 | Haas | Oct. 9, 1934 |
| 2,150,749 | Price | Mar. 14, 1939 |
| 2,352,661 | Snader | July 4, 1944 |
| 2,403,581 | Casella | July 9, 1946 |
| 2,473,507 | Bullard | June 21, 1949 |
| 2,563,918 | Casella | Aug. 14, 1951 |

FOREIGN PATENTS

| Number | Country | Date |
|---|---|---|
| 344,856 | Great Britain | Dec. 10, 1929 |